US012618745B2

(12) United States Patent
Jin et al.

(10) Patent No.:  US 12,618,745 B2
(45) Date of Patent:       May 5, 2026

(54) METHOD FOR PREDICTING, REGULATING AND CONTROLLING WEAR CHARACTERISTIC OF FLOW CHANNEL IN VALVE

(71) Applicant: ZHEJIANG SCI-TECH UNIVERSITY, Zhejiang (CN)

(72) Inventors: Haozhe Jin, Zhejiang (CN); Guofu Ou, Zhejiang (CN); Zuchao Zhu, Zhejiang (CN); Chao Wang, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 288 days.

(21) Appl. No.: 18/559,564

(22) PCT Filed: Dec. 27, 2021

(86) PCT No.: PCT/CN2021/141434
§ 371 (c)(1),
(2) Date: Jan. 11, 2024

(87) PCT Pub. No.: WO2022/237185
PCT Pub. Date: Nov. 17, 2022

(65) Prior Publication Data
US 2024/0240725 A1     Jul. 18, 2024

(30) Foreign Application Priority Data

May 8, 2021    (CN) .......................... 202110499991.2

(51) Int. Cl.
*G01M 13/003*          (2019.01)
*F16K 25/04*            (2006.01)
(52) U.S. Cl.
CPC ........... *G01M 13/003* (2019.01); *F16K 25/04* (2013.01)

(58) Field of Classification Search
CPC ............................. G01M 13/003; F16K 25/04
See application file for complete search history.

(56) References Cited

FOREIGN PATENT DOCUMENTS

CN         201428856          3/2010
CN         103323356          9/2013
(Continued)

OTHER PUBLICATIONS

Numerical Simulation of Solid Particle Erosion in Aluminum Alloy Spool Valve; Mathematical Problems in Engineering vol. 2019, Article ID 9465406, 16 pages https://doi.org/10.1155/2019/9465406; Liu et al. Published: Dec. 5, 2019 (Year: 2019).*

(Continued)

*Primary Examiner* — Ryan D Walsh
(74) *Attorney, Agent, or Firm* — JCIPRNET

(57)                ABSTRACT

A method for predicting, regulating and controlling a wear characteristic of a flow channel in a valve. The method comprises: pasting an aluminum sheet in a valve core, and testing a wear rate; regulating inlet pressure, and obtaining distribution characteristics of a pressure field and a velocity field; establishing an association relationship between the wear rate and pressure and a flow velocity; increasing the inlet pressure, and drawing a discrete data curve and a continuous curve; obtaining a discrete data change curve and a continuous curve of the wear rate along with an opening degree of the valve core; obtaining an association relationship graph between the wear rate of the aluminum sheet and the inlet pressure and the opening degree of the valve core; and performing comparison and determination on a real-time wear rate actual value of the aluminum sheet and a critical wear rate value.

8 Claims, 9 Drawing Sheets

(56)  References Cited

FOREIGN PATENT DOCUMENTS

| | | | |
|---|---|---|---|
| CN | 206309972 | 7/2017 | |
| CN | 206329777 | 7/2017 | |
| CN | 111189636 | 5/2020 | |
| CN | 112032399 | 12/2020 | |
| CN | 212360799 | 1/2021 | |
| CN | 113092102 | 7/2021 | |
| CN | 113108070 | 7/2021 | |
| KR | 19980057278 | 9/1998 | |
| WO | WO-2010137371 A1 * | 12/2010 | ........... F16K 27/041 |

OTHER PUBLICATIONS

WO-2010137371-A1, English Translation (Year: 2010).*
"International Search Report (Form PCT/ISA/210) of PCT/CN2021/141434", mailed on Mar. 29, 2022, with English translation thereof, pp. 1-6.

* cited by examiner

13

3

III

II

I

H h

13

3

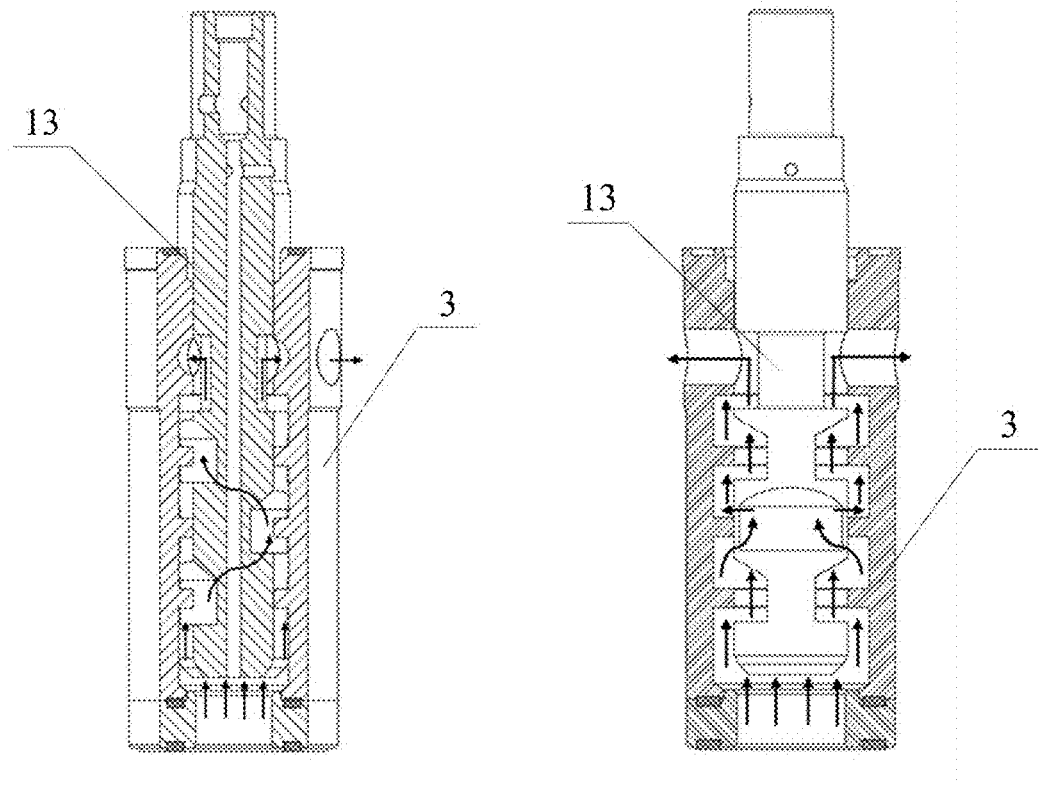
FIG. 7                    FIG. 8

1

METHOD FOR PREDICTING, REGULATING AND CONTROLLING WEAR CHARACTERISTIC OF FLOW CHANNEL IN VALVE

CROSS-REFERENCE TO RELATED APPLICATION

This application is a 371 of international application of PCT application serial no. PCT/CN2021/141434, filed on Dec. 27, 2021, which claims the priority benefit of China application no. 202110499991.2, filed on May 8, 2021. The entirety of each of the above-mentioned patent applications is hereby incorporated by reference herein and made a part of this specification.

BACKGROUND

Technical Field

The present disclosure relates to the technology of regulating valve performance in the process industry, and in particular to a method of predicting, regulating and controlling wear characteristic of flow channel in a multi-stage depressurization string type liquid level regulating valve.

Description of Related Art

Energy resources in China present the current situation of "more coal, lack of oil and less gas", so the development of the modern coal chemical industry is an important measure for ensuring the safety of national energy strategy and ensuring that China reaches the development level of moderately developed countries in the middle of the century. The liquid level regulating valve is a key device in the major process industry, a complex flowing state exists in the regulation and control process, the fault rate thereof is high in the actual operation process, and prediction, prevention and control of the fault are difficult. For example, the wear failure of a high differential pressure regulating valve in the operation of a world first megaton coal liquefaction demonstration project is very serious. Despite the adoption of the high-end product of SchuF, company of Germany, and the addition of more than 2 hundred million investments to design a single channel as four parallel, the service life of the actual single valve is still short. The abrasion failure of the liquid level regulating valve seriously restricts the production safety and economic benefit of the coal chemical industry device and the popularization of national demonstration engineering.

The wear failure process of the high temperature high differential pressure hydraulic control valve is closely related to factors such as a valve body structure, the physical properties of multi-component fluid, the structural characteristics of a fluid domain, material performance, the characteristics of particles and the like, the research on gas-liquid phase change, energy transfer and material response under the transient condition of the liquid level regulating valve is extremely complex, and the development of related theoretical modeling and experimental research is extremely complex. For a high temperature and high differential pressure hydraulic control regulating valve, if the wear characteristics of an internal flow channel of the high temperature and high differential pressure hydraulic control regulating valve cannot be accurately grasped, and a corresponding quantitative wear characteristic prediction method is established, the dynamic regulation and control of the flow wear characteristics of the liquid level regulating valve based on the flow wear characteristic prediction are difficult to realize. The structure optimization design of the high temperature and high differential pressure hydraulic control regulating valve is one of key ways for improving the wear resistance of the high temperature high differential pressure liquid level regulating valve, and although the angle valve structure of the liquid level regulating valve is adjusted to be a multi-stage depressurization string type regulating valve, the throttling capacity of the regulating valve can be effectively improved, higher requirements are provided for the wear resistance between a valve core and a valve sleeve, even between the valve core and a valve base. The existing research results carry out more researches on the internal cavitation and cavitation erosion characteristics of the high differential pressure hydraulic control valve, and also clearly illustrate that the cavitation and cavitation erosion characteristics in the calculation domain of the regulating valve are closely related to the pressure difference between an inlet and an outlet, the cavitation number, the cavitation intensity and the like. In addition, for a coal chemical industry system, particularly a direct coal liquefaction system, the whole process from raw material preparation and reaction separation to residue treatment relates to multiphase flow transmission of pulverized coal solid particles, and the throttling process of the high temperature high differential pressure hydraulic control valve also has a serious flow wear problem.

In summary, in the face of the problem of failure of the high differential pressure hydraulic control regulating valve in a complex flowing and corrosive environment, the internal flow channel of the high differential pressure hydraulic control valve is subjected to a multi-stage depressurization string type design according to the internal flowing characteristic of the high differential pressure hydraulic control valve, so that the internal cavitation and cavitation characteristics can be remarkably reduced. On the basis, the flow wear characteristics of the internal flow channel of the multi-stage depressurization string type liquid level regulating valve are researched, and the correlation relation between the flow wear position and strength, the pressure difference between the inlet and the outlet of the hydraulic control valve and the opening degree of the regulating valve is determined, so that important theoretical support and technical support are provided for accurately regulating and controlling the flow corrosion resistance of the hydraulic control valve.

SUMMARY

In order to solve the problems existing in the prior art, the disclosure aims to provide a multi-stage depressurization string type liquid level regulating valve structure, aiming at the service environment and the structural characteristics of a high differential pressure liquid level control valve, optimization of the multi-stage depressurization string type structure of the high differential pressure liquid control valve is realized, and the service life and the safe and stable operation period of the high differential pressure liquid control valve are prolonged.

In order to achieve the above-mentioned object of the disclosure, the technical solutions adopted by the present disclosure are:

1. A method of predicting, regulating and controlling wear characteristic of a flow channel in a valve, wherein the method comprises:

1) building a circulating pipeline loop, disposing liquid phase oil and particles in the circulating pipeline loop, disposing opposite flanges in a middle region of the circulating pipeline loop, disposing a multi-stage depressurization string type liquid level regulating valve between the opposite flanges, transmitting and pressurizing the liquid phase oil and the particles in the circulating pipeline loop and regulating pressure of an inlet and an outlet of the multi-stage depressurization string type liquid level regulating valve by using a circulating pump and a pressure pump;

2) defining a number of throttling times of fluid in a fluid domain between a valve core (13) and a valve sleeve (3) as a number of stage;

3) during a test, fixing and attaching aluminum sheets at different locations on an inner sidewall of the valve sleeve (3) and an outer sidewall of the valve core (13) at each stage in the multi-stage depressurization string type liquid level regulating valve, and attaching n pressure strain gauges and m current meters to a location near each of the aluminum sheet, real time collecting and converting to obtain m flow velocity value distributions and n pressure value distributions at different positions of the inner sidewall of the valve sleeve (3) and the outer sidewall of the valve core (13) at different times; after each set of experimental tests is completed, testing a wear rate $KE_C$ of the aluminum sheet based on scanning of a laser displacement sensor;

4) regulating an inlet pressure of the multi-stage depressurization string type liquid level regulating valve to 11.7 MPa, using step 3) to convert the obtained n pressure value distributions and m flow velocity value distributions at different times and locations, obtaining distribution characteristics of a pressure field and a velocity field within the fluid domain; building cross correlation between wear rate $KE_C$, pressure distribution and flow velocity distribution based on wear depth of the aluminum sheet obtained by the scanning of the laser displacement sensor;

5) sequentially increasing and regulating the inlet pressure $P_{in}$ of the multi-stage depressurization string type liquid level regulating valve at a fixed pressure interval, repeating the experimental method step 4), and respectively drawing a discrete data curve of the wear rates $KE_C$ of the aluminum sheets in different stages changing with the inlet pressure $P_{in}$;

6) for the discrete data curve of the wear rate $KE_C$ of the aluminum sheet changing with the inlet pressure $P_{in}$, performing data fitting to obtain a continuous curve of the wear rate of the aluminum sheet changing with the inlet pressure 7) dynamically regulating and controlling heights of different valve stems, so that the valve core is driven to move up and down, namely relative to the locations of the valve core sleeve, thereby adjusting opening degree of the multi-stage depressurization string type liquid level regulating valve; under conditions of different opening degrees, testing the wear rate of the aluminum sheet according to change of the opening degrees to obtain a discrete data curve of the wear rate of the aluminum sheet changing with the openness of the valve core, thereby obtaining a continuous curve of the wear rate of the aluminum sheet changing with the openness of the valve core through data fitting; further obtaining association relationship graph of the wear rate of the aluminum sheet, the inlet pressure and the opening degree of the valve core by using the continuous curve of the wear rate of the aluminum sheet changing with the inlet pressure, combined with the continuous curve of the wear rate of the aluminum sheet changing with the opening degree of the valve core;

8) Similarly, repeating step 7), changing particle size and particle concentration, continuingly to further obtain association relationship graph of the wear rate of the aluminum sheet, the inlet pressure, the opening degree of the valve core, particle size and particle concentration;

9) during dynamically regulating process, pre-setting a critical wear rate [ε] based on a wear resistant characteristic and a wear setting allowance of the aluminum sheet, and comparing based on real time dynamic wear rate actual value $KE_C$ of aluminum sheet and the critical wear rate [ε]:

If $KE_C<0.95[ε]$, then the valve stem location, the inlet pressure and the opening degree of the valve core remain unchanged;

If $KEC≥0.95[ε]$, then the opening degree of the valve core, the inlet pressure, the particle size and the particle concentration are regulated, and dynamically update the real time wear rate actual value $KE_C$ of the aluminum sheet in until $KEC<0.95[ε]$, so as to avoid rapid wear and failure of the valve core.

In the specific implementation, the valve is a multi-stage depressurization string type liquid level regulating valve structure, specifically comprising a valve body, a valve base, a valve sleeve, a valve cap and a valve core; a vertical cavity is disposed in the valve body, a valve base is disposed in the vertical cavity, the valve base divides the vertical cavity into a throttling valve core cylindrical cavity located at an upper part and a buffer cylindrical cavity located at a lower part, the valve base is configured with a center through hole, which connects the throttling valve core cylindrical cavity and the buffer cylindrical cavity, an inlet and an outlet are disposed on two sides of the valve body respectively, the inlet is connected to a bottom of the buffer cylindrical cavity, the outlet is connected to a bottom of the throttling valve core cylindrical cavity; the valve sleeve is fixedly disposed in the throttling valve core cylindrical cavity, an annular gap is between an outer sidewall of the valve sleeve and a wall of the throttling valve core cylindrical cavity, the annular gap is connected to the outlet of the valve body; a bottom of the valve sleeve is connected to the valve base, the valve core with a plurality of notches is coaxially disposed in a cavity of the valve sleeve, a flow channel is disposed between the valve core and the valve sleeve to form a multi-stage string type pressure reducing structure; a valve cap is fixedly disposed in an upper port of the valve body, a center hole coaxially connected with the throttling valve core cylindrical cavity is disposed in the center of the valve cap, an end surface around the center hole of the valve cap axially presses the valve sleeve against the valve base; a plurality of through holes evenly disposed on the upper sidewall, along a circumferential direction, of the valve sleeve away from the valve base, a fluid medium flows from the inlet of the valve body into the buffer cylindrical cavity, passes through the center through hole of the valve base and then flows into the throttling valve core cylindrical cavity, the fluid medium after throttling and decompression in the throttling valve core cylindrical cavity flows out from the evenly disposed through holes on the upper sidewall of valve sleeve into the annular gap between the valve body and the valve sleeve, and confluences to the outlet of the valve body through the annular gap.

A valve stem is disposed in the center hole of the valve cap, and an upper end of the valve core passes through the center hole of the valve cap and then is fixedly connected to a lower end of the valve stem.

A guide sleeve is sleeved outside the valve core at a joint of the valve cover and the valve core sleeve.

The annular gap between the valve stem and the center hole of the valve cap is configured, from bottom to top, with a packing mat, a packing, and a packing gland, an upper end of the packing gland protruding from the center hole of the valve cap is configured with an outer flange, a flange is disposed over the packing gland, the flange is fixedly connected to an upper part of the valve cap through a screw, and the flange is pressed against the packing gland through the screw.

The multi-stage string type pressure reducing structure between the valve core and the valve sleeve comprises: a stepped cavity disposed in the valve sleeve located below the through hole at the upper end of the valve sleeve, a plurality of inner flanges, serving as throttling rings, spaced apart axially in the stepped cavity from top to bottom, and the stepped cavity is divided into a plurality of small cavities by the throttling rings; the valve core in the valve core sleeve is characterized in that a plurality of symmetrical groove structures are axially disposed from top to bottom, each of the symmetrical groove structures comprises two grooves respectively and symmetrically arranged at two sides of the valve core along a symmetrical direction, and the symmetrical directions of the two grooves of two adjacent symmetrical groove structures are vertical to each other; an inner diameter of the throttle ring is consistent with an outer diameter of the valve core, and a width of the groove is larger than a thickness of the throttle ring.

The annular grooves are disposed on an upper end surface and a lower end surface of the valve base, and the annular grooves are all configured with a flange spiral wound gasket therein for sealing.

A connecting sheath are coaxially connected between the lower end of the valve stem and the upper end of the valve core, and the valve stem drives the valve core to move axially up and down within the valve sleeve.

The beneficial effects of the present disclosure are:

The present disclosure calibrates the cross correlation model between wear characteristic of the internal channel of the high differential pressure liquid level regulating valve and other influencing factors such as the opening degree of the valve core, inlet pressure, particle size and particle concentration through experimental tests under changing working conditions, and provides a dynamic monitoring and control method of anti-flow wear of multi-stage depressurization string type liquid level regulating valve based on critical flow wear rate, which is suitable for flow wear status monitoring and dynamic control of multi-stage depressurization string type liquid level regulating valve, and realize the self-elimination of the critical characteristic of high differential pressure liquid level regulating valve flow wear under complex service environment.

The disclosure is suitable for the optimized design and optimized operation of multi-stage depressurization string type liquid level regulating valves with high differential pressure in petrochemical industry, coal chemical industry, nuclear power engineering, etc., and the accuracy of prediction and control is high.

BRIEF DESCRIPTION OF THE DRAWINGS

FIG. 7 is a ¼ cross sectional view of cooperation of the valve core and the valve sleeve and a schematic view of flow direction of the internal channel.

FIG. 8 is a schematic view of configuration relationship between the valve core and the valve sleeve when the opening degree of the valve core is 50%.

DESCRIPTION OF THE EMBODIMENTS

The present disclosure will be further described below in conjunction with the accompanying drawings and examples.

Figure 1:
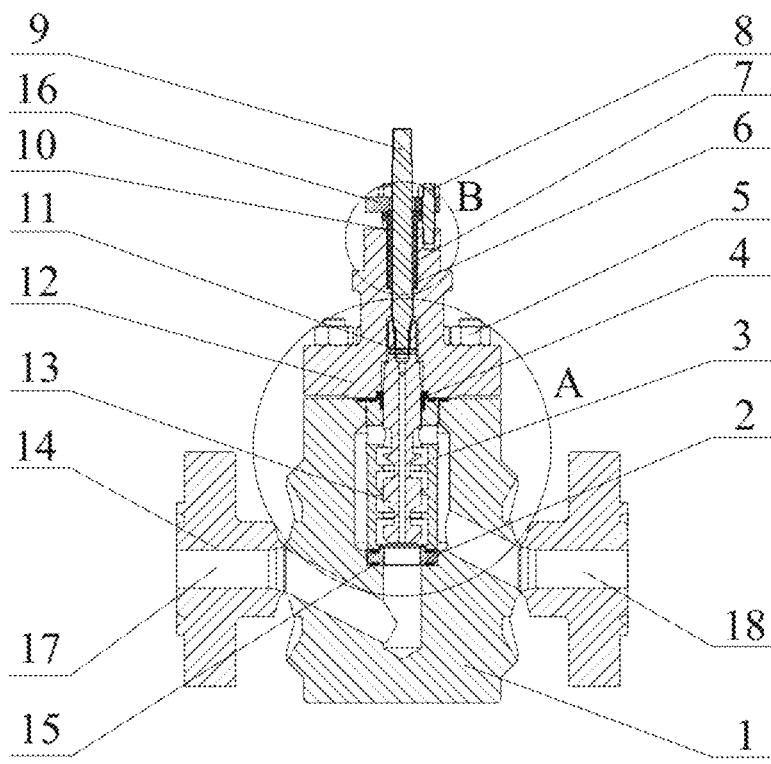
FIG. 1 is a schematic view of a structure according to an embodiment of the present disclosure.
Figure 2:
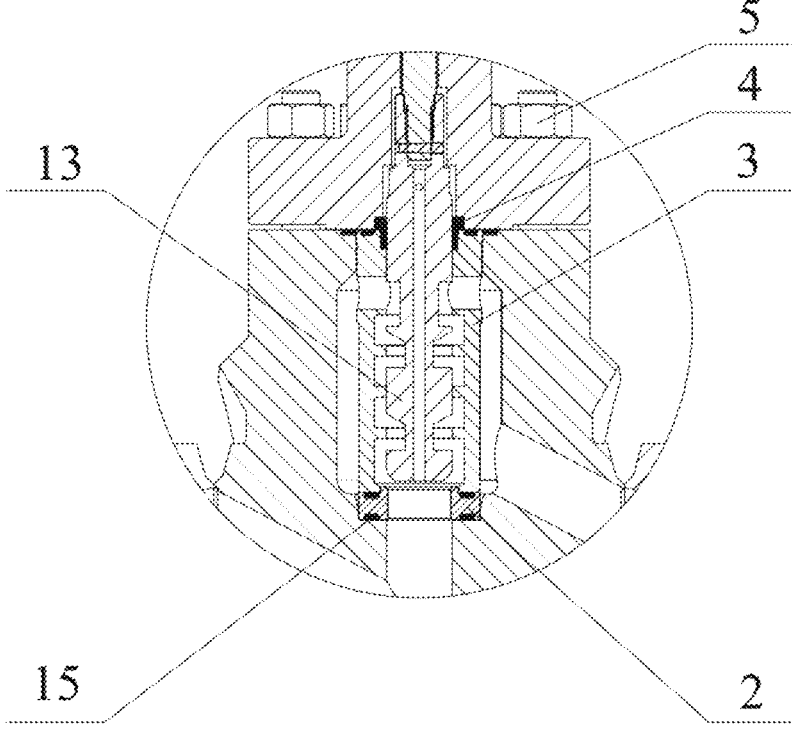
FIG. 2 is an enlarged view of area A in FIG. 1.
Figure 3:
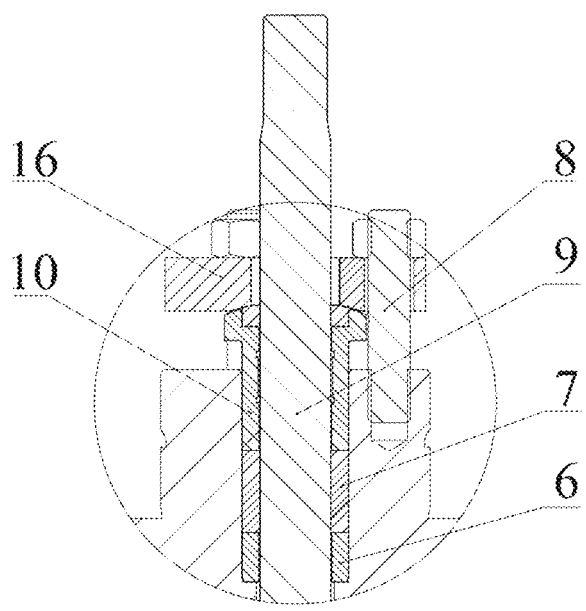
FIG. 3 is an enlarged view of area B in FIG. 1.

As shown in FIG. 1, FIG. 2, and FIG. 3, the valve specifically implemented in the present disclosure includes a valve body 1, a valve base 2, a valve sleeve 3, a valve cap 12, and valve core 13; a vertical cavity is disposed in the valve body 1, and a valve base 2 is disposed in the vertical cavity. The valve base 2 divides the vertical cavity in the valve body 1 into a throttling valve core cylindrical cavity located at an upper part and a buffer cylindrical cavity located at a lower part; the valve base 2 is configured with a center through hole, which connects the throttling valve core cylindrical cavity and the buffer cylindrical cavity, an inlet and an outlet are disposed on two sides of the valve body 1 respectively, wherein annular grooves are disposed on an upper end surface and a lower end surface of the cylindrical valve base 2, and the annular grooves are all configured with a flange spiral wound gasket 15 therein for sealing, such that the valve base 2 is respectively connected to the valve core sleeve 3 and the valve body 1 in a sealing manner through the flange spiral wound gasket 15 in the annular groove on the upper end face and the flange spiral wound gasket 15 in the annular groove on the lower end face.

The valve sleeve 3 is fixedly disposed in the throttling valve core cylindrical cavity, an annular gap is between an outer sidewall of the valve sleeve 3 and a wall of the throttling valve core cylindrical cavity, a lower part of the annular gap is connected to the outlet of the valve body 1; a bottom of the valve sleeve 3 is connected to the valve base 2, the valve core 13 with a plurality of notches is coaxially disposed in a cavity of the valve sleeve 3, a flow channel is disposed between the valve core 13 and the valve sleeve 3 to form a multi-stage string type pressure reducing structure.

The throttling valve core cylindrical cavity penetrates from an upper port of the valve body 1, a valve cap 12 is fixedly disposed in the upper port of the valve body 1. A center hole coaxially connected with the throttling valve core cylindrical cavity is disposed in the center of the valve cap 12, an end surface around the center hole of the valve cap 12 axially presses the valve sleeve 3 against the valve base 2; in the specific embodiment shown in FIG. 3, the center hole of the valve cap 12 is a multi-stage hole with a tapered shape from bottom to top in the axial direction, the upper part of the valve core 13 is embedded into the lower part of the center hole of the valve cap 12. The guide sleeve 4 with a support and guide function is embedded in the annular gap between the valve sleeve 3 and the upper center hole of the valve body and the lower center hole of the valve cap. The end surface of the valve body 1 and is connected and fixed to the lower end surface of valve cap 12 through circumferentially distributed nuts 5.

The upper end sidewall of the valve sleeve 3 away from the valve base 2 is circumferentially evenly configured with a plurality of through holes, usually four through holes. The fluid medium flows from the inlet flow channel 17 of valve body 1 into the buffer cylindrical cavity, passes through the center through hole of the valve base 2, and then flows into the throttling valve core cylindrical cavity, thereby achieving throttling and depressurization. The fluid medium, after being throttled and decompressed, in the throttling valve core cylindrical cavity flows out from the through hole on the upper sidewall of the valve sleeve 3 to the annular gap between the valve body 1 and the valve sleeve 3, and confluences to the outlet flow channel 18 of the valve body 1 through the annular gap and flows out of the outlet flow channel 18.

The inlet flow channel 17 and the outlet flow channel 18 of the valve body 1 are respectively configured with the inlet flange 14 and the outlet flange. The inlet flow channel 17 and the outlet flow channel 18 are connected to the inlet and outlet of the valve body 1 respectively.

The valve stem 9 is disposed in the center hole of the valve cap 12. The upper end of the valve core 13 passes through the center hole of the valve cap 12 and then is fixedly connected to a lower end of the valve stem 9. The lower end of the valve stem 9 and the upper end of the valve core 13 are coaxially connected through the connecting sheath 11, the valve core 13 is driven by the valve stem 9 to move axially up and down within the valve sleeve 3. The valve core 13 at the connection between the valve cap 12 and the valve sleeve 3 is configured with a guide sleeve 13, which is configured to support the up and down movement of the valve core 13 in axial position to ensure the smooth up and down movement of the valve core.

As shown in FIG. 3, the annular gap between the valve stem 9 and the central hole of the valve cover 12 is configured with a packing mat 6, a packing 7, and a packing gland 10 from bottom to top. An upper end of the packing gland 10 protruding from the center hole of the valve cap 12 is configured with an outer flange, a flange 16 is disposed over the packing gland 10, and the flange 16 is pressed against the packing gland 10 through a screw 8.

Figure 4:
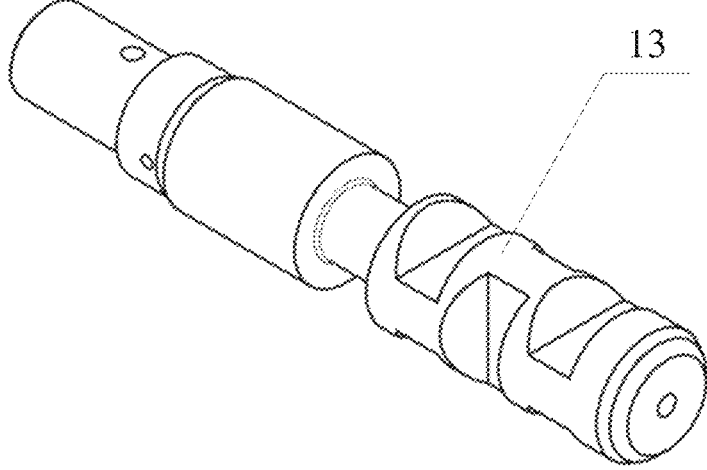
FIG. 4 is an isometric view of the valve core in the present disclosure.

As shown in FIG. 4, the valve core (13) in the valve core sleeve (3) is characterized in that a plurality of symmetrical groove structures are axially disposed from top to bottom, each of the symmetrical groove structures includes two grooves respectively and symmetrically arranged at two sides of the valve core 13 along a symmetrical direction, the symmetrical directions of the two grooves of two adjacent symmetrical groove structures are vertical to each other. Combining FIG. 5. FIG. 6, and FIG. 7, it can be seen that the multi-stage string type depressurization structure between the valve core 13 and the valve sleeve 3 specifically includes: a stepped cavity disposed in the valve sleeve 3 located below the through hole at the upper end of the valve sleeve 3, a plurality of inner flanges, serving as throttling rings, spaced apart axially in the stepped cavity from top to bottom, and the stepped cavity is divided into a plurality of small cavities by the throttling rings. An inner diameter of the throttle ring is consistent with an outer diameter of the valve core 13, and a width of the groove is larger than a thickness of the throttle ring.

Figure 5:
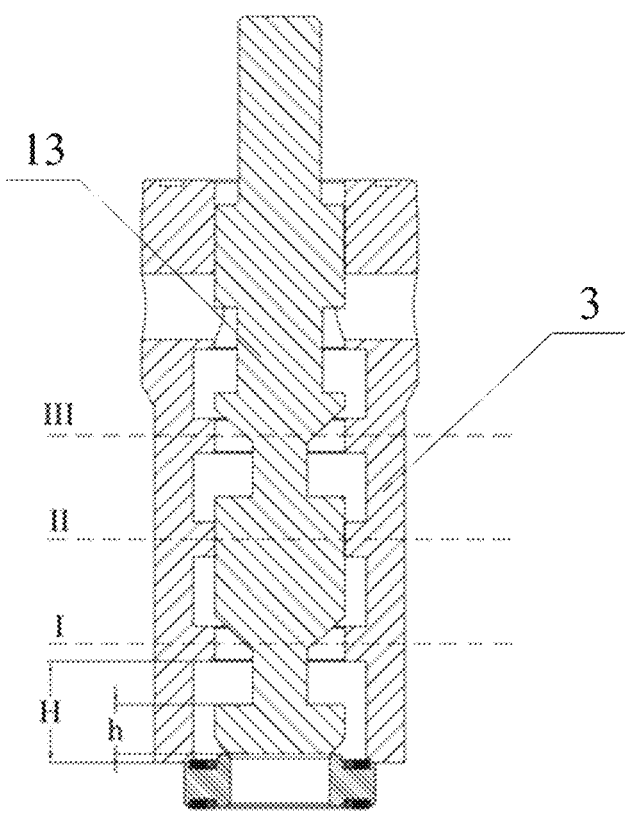
FIG. 5 is a schematic view showing cooperation relationship between the valve core and the valve sleeve in the present disclosure.
Figure 6:
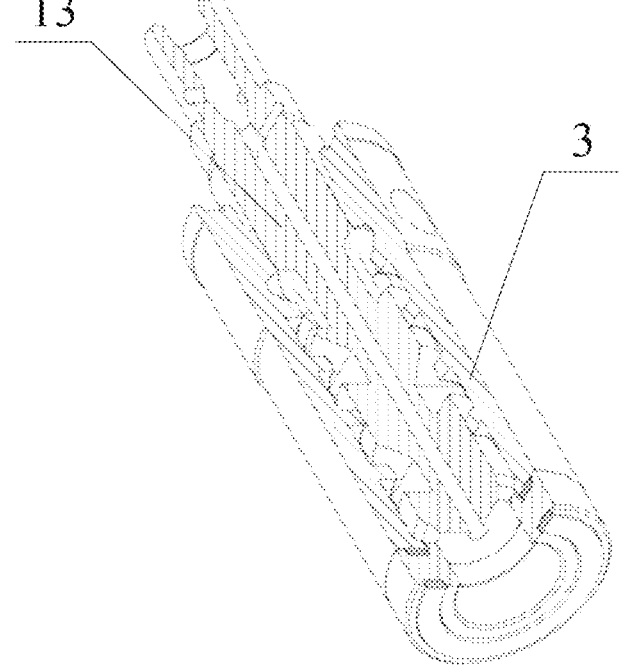
FIG. 6 is a ¼ cross sectional view of cooperation of the valve core and the valve sleeve in the present disclosure.

As shown in FIG. 5, the stepped cavity disposed in the valve sleeve 3 is provided with three inner flanges spaced apart at equidistant axial intervals from top to bottom. The three inner flanges divide the entire stepped cavity into four small cavities; it can be seen from FIG. 4 that the valve core 13 located in the valve sleeve 3 is characterized in that three symmetrical groove structures are axially disposed from top to bottom, and the three symmetrical groove structures are arranged at intervals along the axial direction, each of the symmetrical groove structures includes two grooves symmetrically arranged at two sides of the valve core 13 along a symmetry direction. The two grooves of the two adjacent symmetrical groove structures are located in perpendicular directions; the upper groove sidewall of each of the grooves is configured as a transitional inclined surface. The outer peripheral surface of the valve core 13 above the uppermost symmetrical groove structure is provided with an annular groove which is completely surrounding along the annular shape, and the annular groove is located near the through hole at the upper end of the valve sleeve 3.

FIG. 4 is an isometric view of the valve core in the present disclosure. As can be seen from the figure, the structure of the valve core is specifically in a shape of candied haws, showing a multi-stage string structure. The lower end is in cylindrical shape and configured with chamfers. Two grooves of the same size are firstly configured symmetrically and spaced apart by a certain distance upwards at the end of the cylindrical shape, and then two grooves of the same size are spaced apart upward by a certain distance and configured symmetrically in a 90° turn, the lower outer wall of the entire valve core 13 is provided with three pairs of grooves in sequence, and the phase difference between adjacent grooves is 90°.

As shown in FIG. 5, the coordination relationship between valve core and valve sleeve is shown. The internal cavity of the valve sleeve 3 is configured from top to bottom with three sets of throttling rings having holes in the middle and spaced apart by intervals. The outer wall of the throttling ring is welded and fixed to the inner wall of the internal cavity of the valve sleeve 3; the valve core 13 passes through the internal cavity of the valve sleeve 3 from bottom to top. Herein, the diameter of the cylindrical end of the valve core 13 is slightly larger than a diameter of the hole in the middle of the bottommost throttling ring in the internal cavity of the valve sleeve 3. The distance from the lower surface of the bottommost throttling ring of the internal cavity of the valve sleeve 3 to the upper surface of the valve base 2 is defined as H. The height of the cylindrical end of valve core 13 is h, then the maximum stroke of the valve core 13 in the valve sleeve 3 is H–h, that is, the opening degree range of the valve core is 0~(H–h). The center of the height direction of the throttling ring, from bottom to top, in the inner cavity of the valve sleeve 3 is defined as a horizontal cross section, which are defined as the first stage of the regulate valve, the second stage of the regulate valve, and the third stage of the regulate valve, which are illustrated as section I, section II, and section III. Correspondingly, a number of stages of the regulate valve represents a number of throttling times of the fluid medium in the regulator valve.

Figure 9:
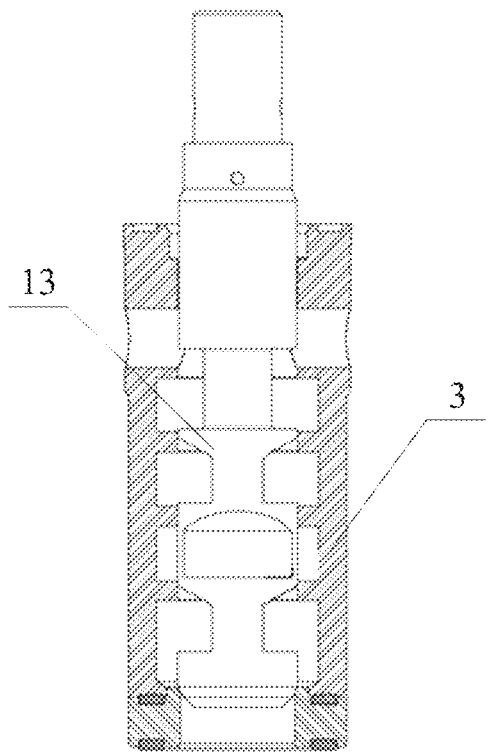
FIG. 9 is a schematic view of the configuration relationship between the valve core and the valve sleeve when the opening degree of the valve core is 0%.
Figure 10:
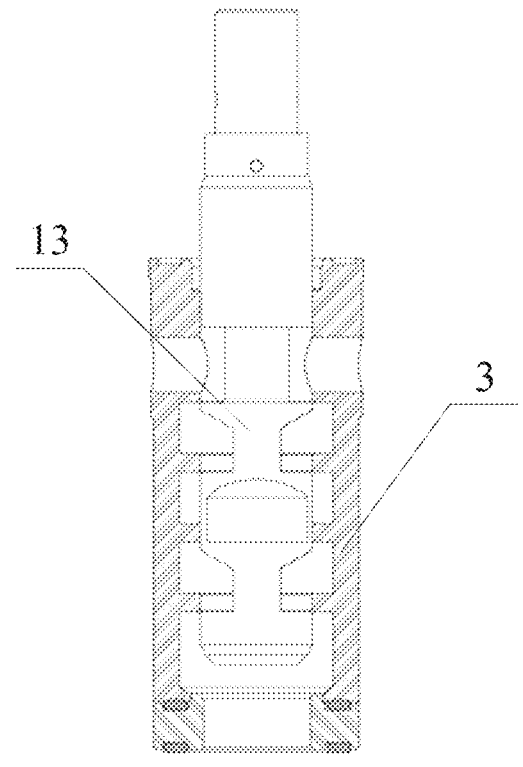
FIG. 10 is a schematic diagram of the positional relationship between the valve core and the valve sleeve when the opening degree of the valve core is 100%.

FIG. 6 and FIG. 7 are respectively a ¼ cross sectional view (axonometric view) of the valve core and valve sleeve, a ¼ cross sectional view of the valve core and valve sleeve, and a schematic view of the flow direction of the internal channel. The valve stem 9 drives the valve core 13 to move axially up and down in the valve sleeve 3, a plurality of symmetrical groove structures are arranged non-aligned on the valve core 13, so that the plurality of symmetrical groove structures of the valve core 13 reciprocate in each of the throttling rings of the valve sleeve 3, the throttling area is changed, and controlling and adjusting different opening degrees of the valve core is achieved. Herein, the axial position of the valve core 13 relative to the valve core sleeve is different, and the gap between the symmetrical groove structure and the throttle ring is different, resulting in different flow areas of the fluid medium, which in turn triggers different opening degrees of the valve core, resulting in different flow areas and flow velocitys in the fluid domain, and multi-stage depressurization series liquid level regulation is realized. FIG. 6 and FIG. 7 merely illustrate the valve core structure of three symmetrical grooves. In actual engineering practice, more valve core structures of symmetrical grooves can be set up to achieve higher pressure regulation. Combined with the definition of opening degree in FIG. 5, when the lower end surface of the valve core 13 is pressed tightly and connected to the upper end surface of the center through hole of the valve base 2, the opening degree of the valve is zero and is in a closed state. At this time, the fluid medium of the buffer cylindrical cavity cannot flow to the throttling valve core cylindrical cavity, its structural schematic view is shown in FIG. 9, which shows the configuration relationship between the valve core and the valve sleeve when the opening degree of the valve core is 0%. Similarly, when the distance between the lower end surface of the valve core 13 and the center through hole of the upper end surface of the valve base 2 is (H–h), the opening degree at this time is 100%, as shown in FIG. 10, and the fluid in the throttling cavity does not flow at this time.

FIG. 8 shows a schematic view of the configuration relationship between the valve core and the valve sleeve when the opening degree of the valve core is 50%. When valve core 13 is at the middle position of the movable opening degree, the opening degree thereof is in the middle level, that is, 50% (H–h). At this time, the fluid medium in the buffer cylindrical cavity flows into the lowermost small cavity of the valve sleeve 3 through the center through hole of the valve base 2, and then enters the next small cavity of the valve sleeve 3 through the symmetrical groove of the valve core 13, and so on, it flows to the last small cavity at the uppermost end of the valve sleeve 3, then flows from the annular groove of valve core 13 to the through hole of the upper sidewall of the valve sleeve 3, and flows out from the through hole of the upper sidewall of the valve sleeve 3 to the annular gap between the valve body 1 and valve sleeve 3, and finally confluences to the outlet of the valve body 1 and flows out.

The method of predicting, regulating and controlling the wear characteristic of the flow channel in the valve specifically implemented in the present disclosure includes the following steps:

1) Building a circulating pipeline loop, disposing liquid phase oil and particles in the circulating pipeline loop, disposing opposite flanges in a middle region of the circulating pipeline loop, disposing a multi-stage depressurization string type liquid level regulating valve between the opposite flanges, transmitting and pressurizing the liquid phase oil and the particles in the circulating pipeline loop and regulating pressure of an inlet and an outlet of the multi-stage depressurization string type liquid level regulating valve by using a circulating pump and a pressure pump; setting the inlet pressure of the multi-stage pressure reducing string type liquid level regulating valve to inlet pressure $P_{in} \geq 11.7$ MPa and outlet pressure being 3 MPa.

2) Defining a number of throttling times of fluid in a fluid domain between a valve core 13 and a valve sleeve 3 as a number of stage. The center of the height direction of the throttling ring, from bottom to top, in the inner cavity of the valve sleeve 3 is defined as a horizontal cross section, which are defined as the first stage of the regulate valve, the second stage of the regulate valve, and the third stage of the regulate valve, which are illustrated as section I, section II, and section III. Correspondingly, a number of stages of the regulate valve represents a number of throttling times of the fluid medium in the regulator valve. After the fluid is throttled from the area above section III, it flows to the four through holes circumferentially arranged around the upper part of the valve core sleeve.

3) During a test, fixing and attaching aluminum sheets at different locations on an inner sidewall of the valve sleeve 3 and an outer sidewall of the valve core 13 at each stage in the multi-stage depressurization string type liquid level regulating valve, and attaching n pressure strain gauges and m current meters to a location near each of the aluminum sheet, real time collecting and converting to obtain m flow velocity value distributions and n pressure value distributions at different positions of the inner sidewall of the valve sleeve (3) and the outer sidewall of the valve core (13) at different times; after each set of experimental tests is completed, testing a wear rate $KE_C$ of the aluminum sheet based on scanning of a laser displacement sensor.

Figure 11:
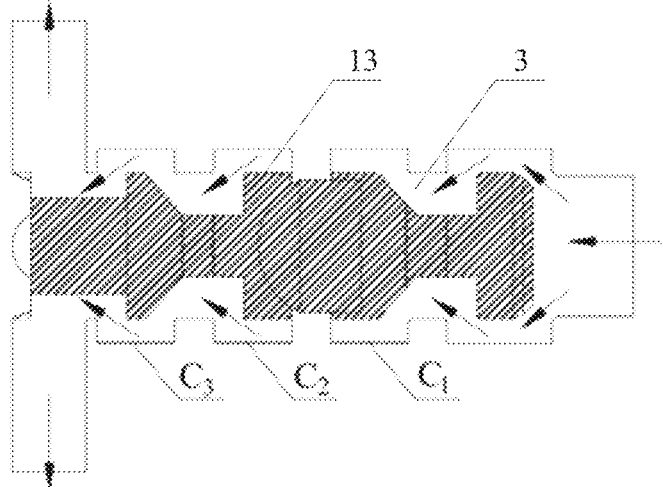
FIG. 11 is a two-dimensional cross-sectional view of assembly of the valve core and valve sleeve of the present disclosure.
Figure 12:
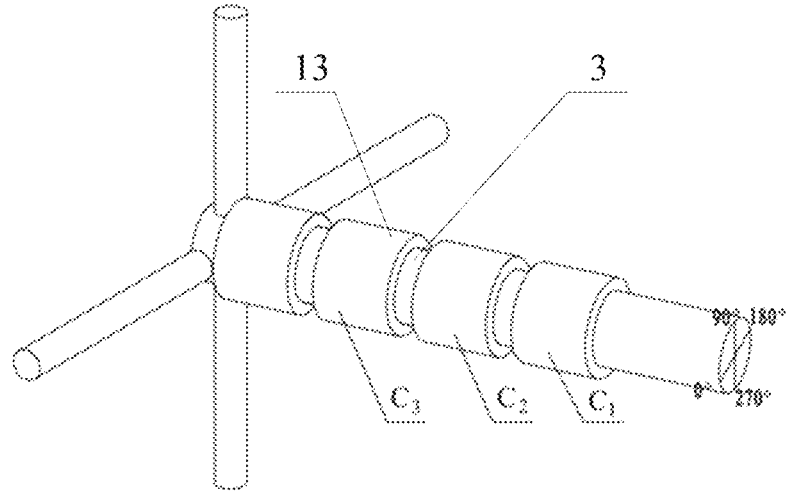
FIG. 12 is a three-dimensional schematic view of the assembly of the valve core and valve sleeve of the present disclosure.

FIG. 11 and FIG. 12 respectively show a two-dimensional cross-sectional view of the assembly of the valve core and valve sleeve, and a three-dimensional schematic view of the assembly of the valve core and the valve sleeve. Herein, three cylindrical surfaces $C_1$, $C_2$, and $C_3$ are marked on the inner cylindrical surface of the valve sleeve, which correspond to the first stage of the regulating valve, the second stage of the regulating valve, and the third stage of the regulating valve respectively. The annular aluminum sheet is fixed and attached to the inner wall of the valve sleeve 3 and the outer wall of the valve core 13 respectively.

4) Regulating an inlet pressure of the multi-stage depressurization string type liquid level regulating valve to 11.7 MPa, using step 3) to convert the obtained n pressure value distributions and m flow velocity value distributions at different times and locations, obtaining distribution characteristics of a pressure field and a velocity field within the

Figure 13:
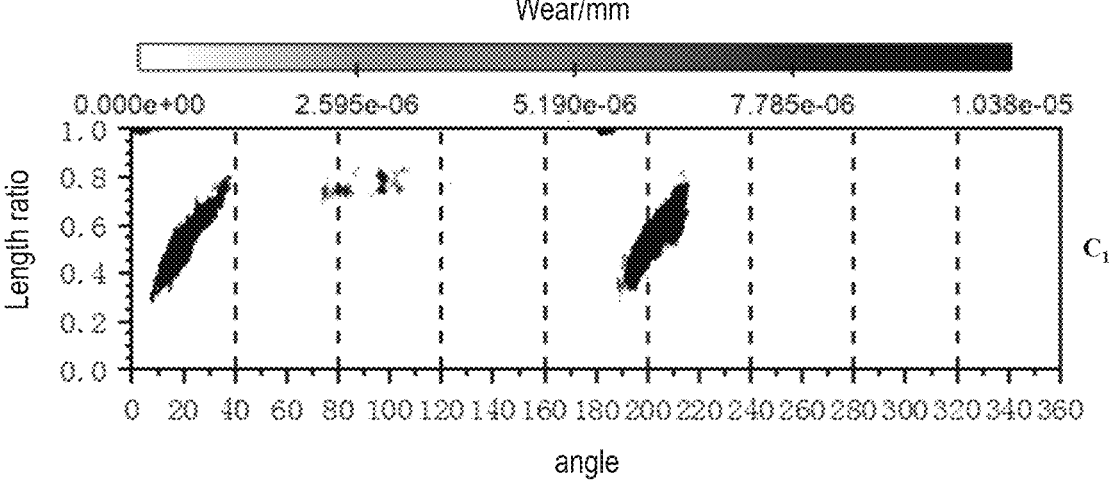
FIG. 13 is a diagram showing wear depth distribution characteristics of $C_1$ cylindrical expansion surface under a certain opening degree of the valve core in the present disclosure.

12 fluid domain; building cross correlation between wear rate $KE_C$, pressure distribution and flow velocity distribution based on wear depth of the aluminum sheet obtained by the scanning of the laser displacement sensor. FIG. 13 shows the distribution characteristics of the wear depth of the cylindrical surface $C_1$ along its circumferential direction under a certain opening degree of the valve core obtained from the test. The vertical coordinate of length ratio is defined as the ratio of the height value $H_C$ along the height direction of $C_1$ to the perimeter of $C_1$ to determine the height position of wear failure; the horizontal coordinate is the phase angle matching the end face of the valve core in FIG. 12 to determine the phase position of the circumferential region of cylindrical surface $C_1$ of the wear failure.

Figures 14, 15:
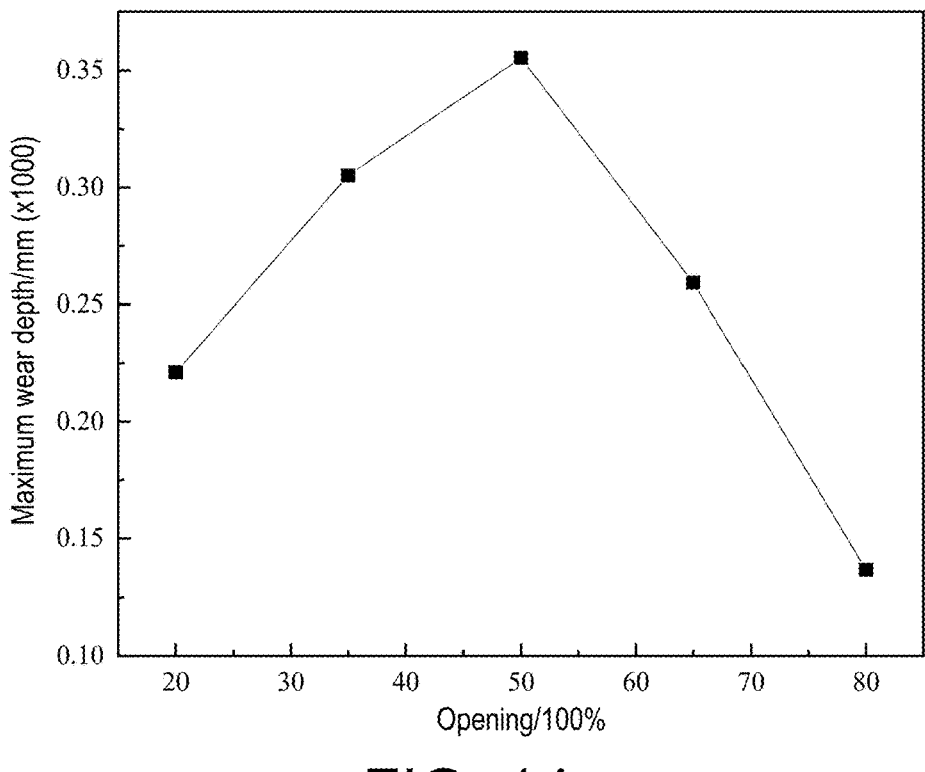
FIG. 14 is a diagram showing the maximum wear depth of $C_1$ cylindrical surface obtained from the test changing with the opening degree of the valve core.
FIG. 15 is a diagram showing the maximum wear depth of $C_1$ cylindrical surface obtained from the test changing with the particle size.
Figure 16:
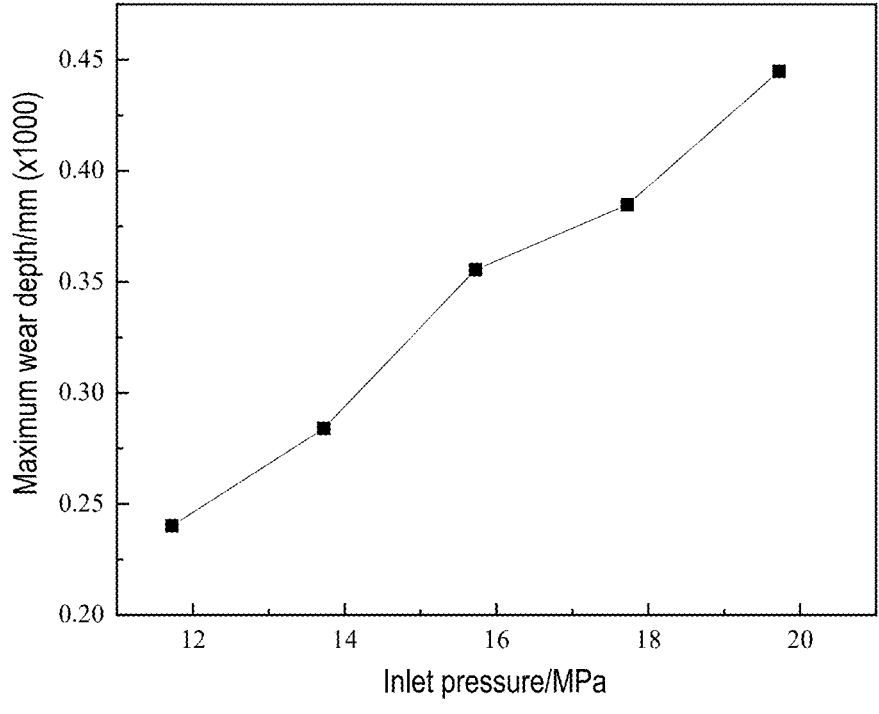
FIG. 16 is a diagram showing the maximum wear depth of $C_1$ cylindrical surface obtained from the test changing with the inlet pressure.

5) Based on step 4), the inlet pressure of the regulating valve is kept constant at 11.7 MPa, regulate different opening degrees of the valve core respectively, such as 0~100% (H–h), and opening degree respectively. the wear rate distribution spectrum corresponding to the cylindrical expansion surfaces of the key areas $C_1$, $C_2$, and $C_3$ with opening degrees of 10%, 20%, 30% until 100% are tested;

6) Sequentially increasing and regulating The inlet pressure $P_{in}$ of the multi-stage depressurization string type liquid level regulating valve at a fixed pressure interval, for example, gradually increasing the pressure of $P_{in}$ to 13.7 MPa, 15.7 MPa, 17.7 MPa, 19.7 MPa, and repeating the experimental method step 4), and respectively drawing a discrete data curve of the wear rates $KE_C$ of the aluminum sheets attached and fixed to key areas $C_1$, $C_2$, and $C_3$ of the inner cylindrical surface of the valve sleeve in different stage fluid domains changing with the inlet pressure $P_{in}$;

7) for the discrete data curve of the wear rate $KE_C$ of the aluminum sheet changing with the inlet pressure $P_{in}$, performing data fitting to obtain a continuous curve of the wear rate of the aluminum sheet changing with the inlet pressure;

8) dynamically regulating and controlling heights of different valve stems, so that the valve core is driven to move up and down, namely relative to the locations of the valve core sleeve, thereby adjusting opening degree of the multi-stage depressurization string type liquid level regulating valve; under conditions of different opening degrees, testing the wear rate of the aluminum sheet according to change of the opening degrees to obtain a discrete data curve of the wear rate of the aluminum sheet changing with the openness of the valve core, thereby obtaining a continuous curve of the wear rate of the aluminum sheet changing with the openness of the valve core through data fitting; further obtaining association relationship graph of the wear rate of the aluminum sheet, the inlet pressure and the opening degree of the valve core by using the continuous curve of the wear rate of the aluminum sheet changing with the inlet pressure, combined with the continuous curve of the wear rate of the aluminum sheet changing with the opening degree of the valve core; FIG. 14 is the variation pattern of the corresponding maximum wear depth of the $C_1$ cylindrical surface with the opening degree of the valve core obtained from the test. FIG. 16 is the variation pattern of the corresponding maximum wear depth of the $C_1$ cylindrical surface obtained from the test changing with the inlet pressure.

9) Similarly, repeating step 7), changing particle size and particle concentration, continuingly to further obtain association relationship graph of the wear rate of the aluminum sheet, the inlet pressure, the opening degree of the valve core, particle size and particle concentration. FIG. 15 is the variation pattern of the maximum wear depth of the corresponding $C_1$ cylindrical surface obtained from the test with the particle size.

10) Based on step 9), obtaining the relationship spectrum of the wear rate $KE_C$ of the aluminum sheet attached and fixed to $C_1$ cylindrical surface and the opening degree of the valve core X1, particle size X2, and inlet pressure X3, obtaining the correlation equation of the wear rate and the opening degree of the valve core, particle size, and inlet pressure through fitting, and the correlation equation is illustrated as:

$$KEC = -0.0189X_1{}^2 + 1.7472X_1 + 0.2571X_2 + 2.5503X_3 - 71.4857$$

In the equation, $X_2$ is diameter, the unit is micron meter (μm), $X_3$ is inlet pressure, the unit is MPa. Similarly, the cross correlation equation between the wear rate of the aluminum sheet attached to the cylindrical surfaces $C_2$ and $C_3$ and opening degree of the valve core, particle size, and inlet pressure can be solved.

11) In the process of dynamically regulating, considering steps 1) to 10) that the tested wear rates are all corresponding to wear rates of the aluminum sheet, therefore, for the actual valve core materials, such as carbon steel and stainless steel, the material coefficient W is set based on the aluminum sheet wear rate $KE_C$ to represent the wear rate corresponding to different materials. For example, the wear rate of carbon steel is illustrated as $W_1 KE_C$, and the wear rate of stainless steel is illustrated as for $W_2 KE_C$; this embodiment merely takes aluminum sheet as an example for introduction. Based on the wear resistance characteristic of the aluminum sheet material (related to the material properties) and the wear design allowance, pre-setting a critical wear rate [ε] based on a wear resistant characteristic and a wear setting allowance of the aluminum sheet, and comparing based on real time dynamic wear rate actual value $KE_C$ of aluminum sheet and the critical wear rate [ε]:

If $KE_C < 0.95[ε]$, the valve stem position, inlet pressure and the opening degree of the valve core remain unchanged;

If $KE_C < 0.95[ε]$, then the valve stem location, the inlet pressure and the opening degree of the valve core remain unchanged;

If $KE_C \geq 0.95[ε]$, then the opening degree of the valve core, the inlet pressure, the particle size and the particle concentration are regulated, and dynamically update the real time wear rate actual value $KE_C$ of the aluminum sheet in until $KE_C < 0.95[ε]$, so as to avoid rapid wear and failure of the valve core.

What is claimed is:

1. A method for predicting, regulating and controlling wear characteristic of a flow channel in a valve, the method comprises:

1) Building a circulating pipeline loop, disposing liquid phase oil and particles in the circulating pipeline loop, disposing opposite flanges in a middle region of the circulating pipeline loop, disposing a multi-stage depressurization string type liquid level regulating valve between the opposite flanges, transmitting and pressurizing the liquid phase oil and the particles in the circulating pipeline loop and regulating pressure of an inlet and an outlet of the multi-stage depressurization string type liquid level regulating valve by using a circulating pump and a pressure pump;

2) Defining a number of throttling times of fluid in a fluid domain between a valve core (13) and a valve sleeve (3) as a number of stages;

3) During a test, fixing and attaching aluminum sheets at different locations on an inner sidewall of the valve sleeve (3) and an outer sidewall of the valve core (13) at each stage in the multi-stage depressurization string type liquid level regulating valve, and attaching n pressure strain gauges and m current meters to a location near each of the aluminum sheet, real time collecting and converting to obtain m flow velocity value distributions and n pressure value distributions at different positions of the inner sidewall of the valve sleeve (3) and the outer sidewall of the valve core (13) at different times; after each set of experimental tests is completed, testing a wear rate $KE_C$ of the aluminum sheet based on scanning of a laser displacement sensor;

4) Regulating an inlet pressure of the multi-stage depressurization string type liquid level regulating valve to 11.7 MPa, using step 3) to convert the obtained n pressure value distributions and m flow velocity value distributions at different times and locations, obtaining distribution characteristics of a pressure field and a velocity field within the fluid domain; building cross correlation between wear rate $KE_C$, pressure distribution and flow velocity distribution based on wear depth of the aluminum sheet obtained by the scanning of the laser displacement sensor;

5) Sequentially increasing and regulating the inlet pressure $P_{in}$ of the multi-stage depressurization string type liquid level regulating valve at a fixed pressure interval, repeating the experimental method step 4), and respectively drawing a discrete data curve of the wear rates $KE_C$ of the aluminum sheets in different stages changing with the inlet pressure $P_{in}$;

6) For the discrete data curve of the wear rate $KE_C$ of the aluminum sheet changing with the inlet pressure $P_{in}$, performing data fitting to obtain a continuous curve of the wear rate of the aluminum sheet changing with the inlet pressure;

7) Dynamically regulating and controlling heights of different valve stems, so that the valve core is driven to move up and down, relative to the locations of the valve core sleeve, thereby adjusting opening degree of the multi-stage depressurization string type liquid level regulating valve; under conditions of different opening degrees, testing the wear rate of the aluminum sheet according to change of the opening degrees to obtain a discrete data curve of the wear rate of the aluminum sheet changing with the openness of the valve core, thereby obtaining a continuous curve of the wear rate of the aluminum sheet changing with the openness of the valve core through data fitting; further obtaining association relationship graph of the wear rate of the aluminum sheet, the inlet pressure and the opening degree of the valve core by using the continuous curve of the wear rate of the aluminum sheet changing with the inlet pressure, combined with the continuous curve of the wear rate of the aluminum sheet changing with the opening degree of the valve core;

8) repeating step 7), changing particle size and particle concentration, continuingly to further obtain association relationship graph of the wear rate of the aluminum sheet, the inlet pressure, the opening degree of the valve core, particle size and particle concentration;

9) during a dynamically regulating process, pre-setting a critical wear rate [ε] based on a wear resistant characteristic and a wear setting allowance of the aluminum sheet, and comparing based on real time dynamic wear rate actual value $KE_C$ of aluminum sheet and the critical wear rate [ε]:

if $KE_C<0.95[ε]$, then the valve stem location, the inlet pressure and the opening degree of the valve core remain unchanged;

if $KE_C≥0.95[ε]$, then the opening degree of the valve core, the inlet pressure, the particle size and the particle concentration are regulated, and dynamically update the real time wear rate actual value $KE_C$ of the aluminum sheet until $KE_C<0.95[ε]$, so as to avoid rapid wear and failure of the valve core.

2. The method for predicting, regulating and controlling wear characteristic of the flow channel in the valve as claimed in claim 1, wherein the valve is a multi-stage depressurization string type liquid level regulating valve structure, specifically comprising a valve body (1), a valve base (2), a valve sleeve (3), a valve cap (12) and a valve core (13); a vertical cavity is disposed in the valve body (1), a valve base (2) is disposed in the vertical cavity, the valve base (2) divides the vertical cavity into a throttling valve core cylindrical cavity located at an upper part and a buffer cylindrical cavity located at a lower part, the valve base (2) is configured with a center through hole, which connects the throttling valve core cylindrical cavity and the buffer cylindrical cavity, an inlet and an outlet are disposed on two sides of the valve body (1) respectively, the inlet is connected to a bottom of the buffer cylindrical cavity, the outlet is connected to a bottom of the throttling valve core cylindrical cavity; the valve sleeve (3) is fixedly disposed in the throttling valve core cylindrical cavity, an annular gap is between an outer sidewall of the valve sleeve (3) and a wall of the throttling valve core cylindrical cavity, the annular gap is connected to the outlet of the valve body (1); a bottom of the valve sleeve (3) is connected to the valve base (2), the valve core (13) with a plurality of notches is coaxially disposed in a cavity of the valve sleeve (3), a flow channel is disposed between the valve core (13) and the valve sleeve (3) to form a multi-stage string type pressure reducing structure; a valve cap (12) is fixedly disposed in an upper port of the valve body (1), a center hole coaxially connected with the throttling valve core cylindrical cavity is disposed in the center of the valve cap (12), an end surface around the center hole of the valve cap (12) axially presses the valve sleeve (3) against the valve base (2); a plurality of through holes evenly disposed on the upper sidewall, along a circumferential direction, of the valve sleeve (3) away from the valve base (2), a fluid medium flows from the inlet of the valve body (1) into the buffer cylindrical cavity, passes through the center through hole of the valve base (2) and then flows into the throttling valve core cylindrical cavity, the fluid medium after throttling and decompression in the throttling valve core cylindrical cavity flows out from the evenly disposed through holes on the upper sidewall of valve sleeve (3) into the annular gap between the valve body (1) and the valve sleeve (3), and confluences to the outlet of the valve body (1) through the annular gap.

3. The method for predicting, regulating and controlling wear characteristic of the flow channel in the valve as claimed in claim 2, wherein a valve stem (9) is disposed in the center hole of the valve cap (12), and an upper end of the valve core (13) passes through the center hole of the valve cap (12) and then is fixedly connected to a lower end of the valve stem (9).

4. The method for predicting, regulating and controlling wear characteristic of the flow channel in the valve as claimed in claim 3, wherein the annular gap between the valve stem (9) and the center hole of the valve cap (12) is configured, from bottom to top, with a packing mat (6), a packing (7), and a packing gland (10), an upper end of the packing gland (10) protruding from the center hole of the valve cap (12) is configured with an outer flange, a flange (16) is disposed over the packing gland (10), the flange (16) is fixedly connected to an upper part of the valve cap through a screw (8), and the flange (16) is pressed against the packing gland (10) through the screw (8).

5. The method of predicting and controlling valve internal channel wear characteristic as claimed in claim 3, wherein a connecting sheath (11) is coaxially connected between the lower end of the valve stem (9) and the upper end of the valve core (13), and the valve stem (9) drives the valve core (13) to move axially up and down within the valve sleeve (3).

6. The method of predicting and controlling valve internal channel wear characteristic as claimed in claim 2, wherein a guide sleeve (4) is sleeved outside the valve core (13) at a joint of the valve cover (12) and the valve core sleeve (3).

7. The method for predicting, regulating and controlling wear characteristic of the flow channel in the valve as claimed in claim 2, wherein the multi-stage string type pressure reducing structure between the valve core (13) and the valve sleeve (3) comprises: a stepped cavity disposed in the valve sleeve (3) located below the through hole at the upper end of the valve sleeve (3), a plurality of inner flanges, serving as throttling rings, spaced apart axially in the stepped cavity from top to bottom, and the stepped cavity is divided into a plurality of small cavities by the throttling rings; the valve core (13) in the valve core sleeve (3) is characterized in that a plurality of symmetrical groove structures are axially disposed from top to bottom, each of the symmetrical groove structures comprises two grooves respectively and symmetrically arranged at two sides of the valve core (13) along a symmetrical direction, and the symmetrical directions of the two grooves of two adjacent symmetrical groove structures are vertical to each other; an inner diameter of the throttle ring is consistent with an outer diameter of the valve core (13), and a width of the groove is larger than a thickness of the throttle ring.

8. The method for predicting, regulating and controlling wear characteristic of the flow channel in the valve as claimed in claim 2, wherein annular grooves are disposed on an upper end surface and a lower end surface of the valve base (2), and the annular grooves are all configured with a flange spiral wound gasket (15) therein for sealing.

* * * * *